United States Patent [19]
Neulander et al.

[11] 3,797,202
[45] Mar. 19, 1974

[54] MICROPOROUS/NON-POROUS COMPOSITE MEMBRANES

[75] Inventors: Charles K. Neulander; William J. Ward, III, both of Schenectady, N.Y.

[73] Assignee: General Electric Company, Schenectady, N.Y.

[22] Filed: Aug. 27, 1971

[21] Appl. No.: 175,670

[52] U.S. Cl. ................................................. 55/158
[51] Int. Cl. ............................................ B01d 53/22
[58] Field of Search ......... 55/16, 158; 210/321, 500

[56] References Cited
UNITED STATES PATENTS

| | | | |
|---|---|---|---|
| 3,520,803 | 7/1970 | Iaconelli | 55/16 |
| 3,624,983 | 12/1971 | Ward | 55/16 |
| 2,960,462 | 11/1960 | Lee et al. | 210/321 |
| 3,447,286 | 6/1969 | Dounoucos | 55/16 |
| 3,416,985 | 12/1968 | Dounoucos | 55/16 |
| 3,510,387 | 5/1970 | Robb | 55/16 |
| 3,567,810 | 3/1971 | Baker | 264/41 |
| 3,615,024 | 10/1971 | Michaels | 210/490 |

Primary Examiner—Charles N. Hart
Attorney, Agent, or Firm—Leo I. MaLossi; Joseph T. Cohen; Jerome C. Squillaro

[57] ABSTRACT

A microporous/non-porous membrane laminate construction is described for incorporation in membrane package construction. One or both sides of the non-porous membrane is covered with a microporous membrane to form a membrane assembly. An exemplary membrane package construction employing the membrane assembly is described.

5 Claims, 8 Drawing Figures

INVENTORS:
CHARLES K. NEULANDER;
WILLIAM J. WARD, III,

THEIR ATTORNEY

INVENTORS:
CHARLES K. NEULANDER;
WILLIAM J. WARD, III,

THEIR ATTORNEY

PATENTED MAR 19 1974

INVENTORS:
CHARLES K. NEULANDER;
WILLIAM J. WARD, III, by Geo. J. Macossi

THEIR ATTORNEY

MICROPOROUS/NON-POROUS COMPOSITE MEMBRANES

BACKGROUND OF THE INVENTION

Exemplary membrane package constructions are shown in U.S. Pat. Nos. 3,564,819 — Neulander et al.; 3,354,618 — Dounoucos and 3,416,985 — Dounoucos. The Neulander et al. patent is incorporated by reference.

In each of these constructions a plurality of spaced single membranes are disposed in substantially parallel surface-to-surface array so as to define both a first group of flow volumes and a second group of flow volumes alternating between the first group. After assembly, the edges of the membranes and spacing means are bonded together to form a sealed device.

The term "non-porous" as applied herein refers both to solid imperforate membranes and to porous membranes containing liquid lodged in the pores thereof.

It has been found in testing completed gas separation membrane packages using non-porous membranes, that an unacceptably large number of membrane packages had to be rejected because of cross-membrane leakage. This leakage became evident under the application of pressure differentials across the membranes during testing. These leaks appeared to be the result of very tiny pin holes or tears in the membrane structure, which either were present before assembly of the package and were not visually detectable, or were caused after assembly of the membranes to form the package. The damage caused in the latter instance could have resulted (a) from compression of the membranes into adjacent screen separators or else (b) from abrasion of the membranes by the adjacent screen separators. The leak rates for such cross-membrane breaches are of the order of at least several cubic centimeters/sec. for pressure differences as small as 1–2 psi. Such leakage rates are, of course, unacceptable for most gas separation applications.

SUMMARY OF THE INVENTION

The instant invention greatly reduces cross-membane gas leakage by employing in place of each of the spaced single membranes a membrane assembly comprising a non-porous membrane and at least one microporous membrane in face-to-face contact therewith. If only one microporous membrane is employed it is disposed on what will be the high pressure side of the non-porous membrane during use. The microporous membrane is usually thinner and more wear resistant than the non-porous membrane and, in view of its disposition on the high pressure side of the non-porous membrane, will automatically enter and plug any breaches therethrough.

BRIEF DESCRIPTION OF THE DRAWINGS

The exact nature of this invention as well as objects and advantages thereof will be readily apparent from consideration of the following specification relating to the annexed drawing in which.

DESCRIPTION OF THE PREFERRED EMBODIMENT

Although the improved construction of the instant invention may be applied to gas separation devices, gas concentrator devices, blood oxygenators, etc., the utilization thereof for the preparation of gas separation devices will be described by way of example.

Figure 1:
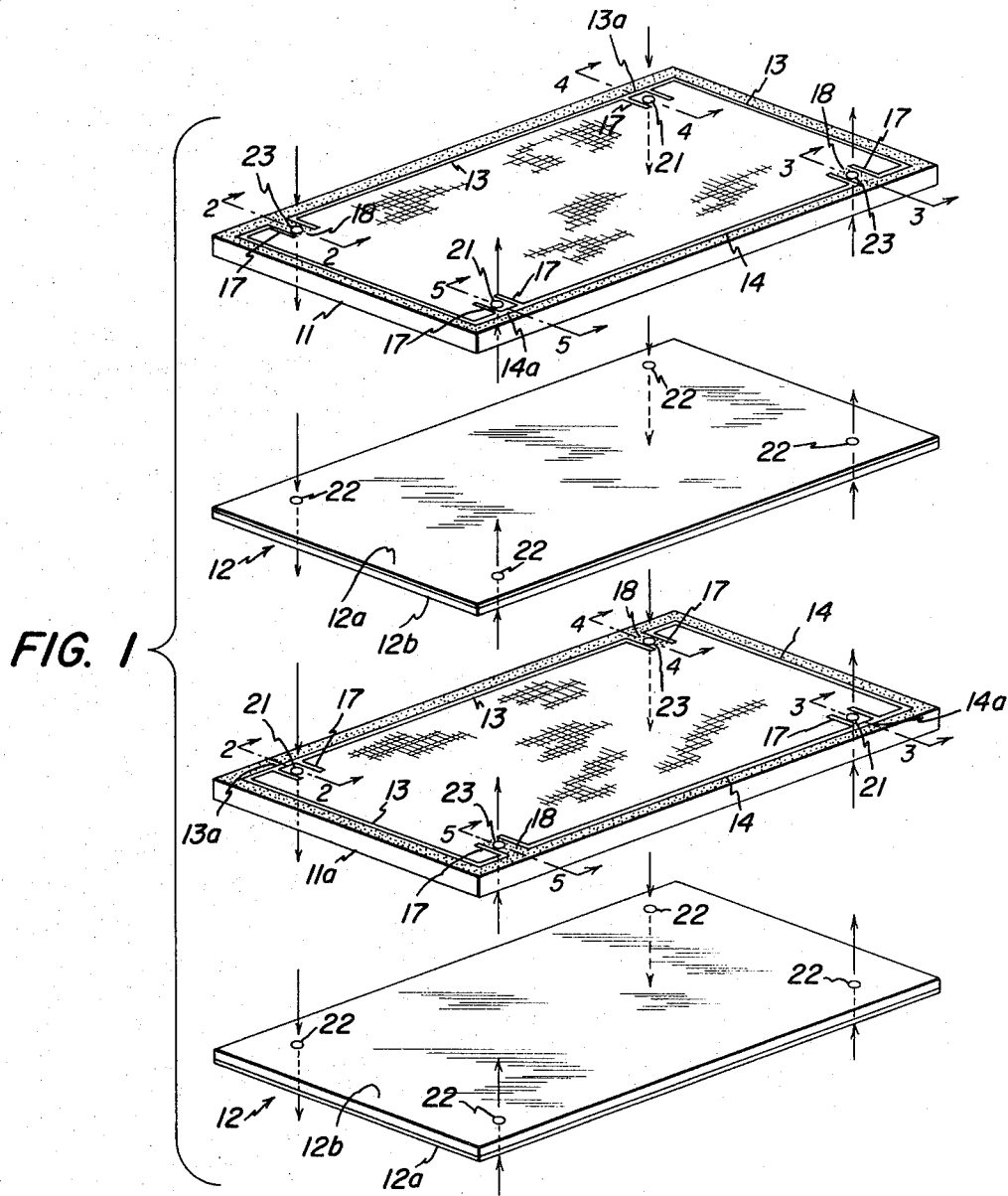
FIG. 1 is an exploded view of the spacing means and interposed membrane assembly constructions and shows the spacing means as they would appear in the completed structure (the end plates and gaskets are not shown)
Figure 2:
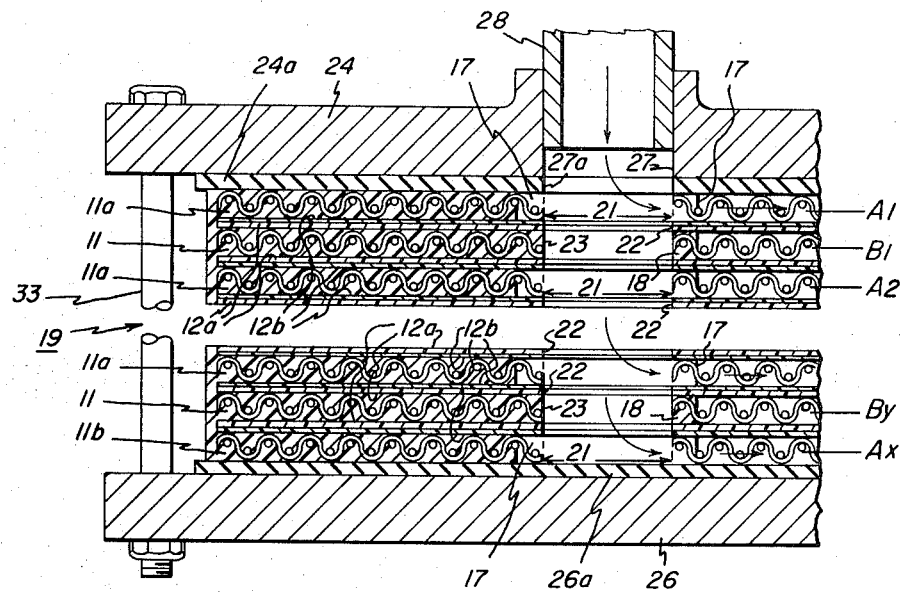
FIG. 2 is an enlarged sectional view taken on line 2—2 of FIG. 8 (the relationship of this section to each disposition of the spacing means encountered in the device is also shown in FIG. 1)

A repetitive stack arrangement comprising separator screen 11, membrane assembly 12, separator screen 11a, and the next membrane assembly 12 is shown in FIG. 1. Each membrane assembly 12 comprises non-porous membrane 12a and microporous membrane 12b. The particular disposition of membranes 12a and 12b relative to each other is such as to place microporous membrane 12b on the high pressure side of non-porous membrane 12a during operation. Separator screens 11, 11a are identically made, but are disposed in reverse fashion in the stack.

The microporous membranes useful in this invention have pore sizes ranging from about 30 to about 3,000A and have porosities (pore volumes) ranging from about 30 to about 80 percent. The gas permeability of microporous membranes useful in this invention should be in the range of from about 10 to about 100 times that of the particular non-porous membrane employed in order to avoid significant resistance to gas penetration therethrough. The ratio of the thickness of the microporous membrane to the thickness of the non-porous membrane may be in the range of from about 1:1 to 1:10. The preferred range of ratios is 1:4 – 1:6. Further, the microporous membrane material should be abrasion resistant and flexible.

Among the suitable materials available in microporous form are polypropylene, polyethylene and polytetrafluoroethylene. In preparing membrane assemblies involving immobilized liquid membranes, the microporous membrane must be of a material that is not wet by the liquid constituent of the immobilized liquid membrane.

Preferably, separator screens 11, 11a are woven screens e.g., polyester or nylon monofilament screen cloth having mesh openings in the range of about 400 microns to about 1,200 microns and an open area ranging from about 45 to 55 percent. Other sizes of mesh openings and percentages of open area may be used depending upon the strength of the membranes employed, the pressure difference prevailing across the membrane and the criteria to be set for fluid flow through the screens. Screens prepared from other materials may be employed so long as the material is capable of retaining its structural integrity under the operating conditions and is compatible with the fluids employed.

The preparation of various imperforate membranes for gas separation is disclosed in U.S. Pat. No. 3,396,510 — Ward et al.; U.S. Pat. No. 3,335,545 — Robb et al., and U.S. Pat. No. 3,325,330 — Robb, for example. Useful capability for resisting pressure differentials has also been obtained with immobilized liquid membranes in which the liquid is lodged in the pores of a microporous layer made of a material wet by the liquid used.

By way of example, an imperforate immobilized liquid membrane was prepared by impregnating a 5 mil thick sheet of the filter material sold under the trademark "Solvinert" (0.25 micron nominal pore size) with a saturated cesium bicarbonate aqueous solution. Tests have shown that the bubble point (the pressure needed to dislodge the liquid from the pores) for this material is at least 30 psi, if the Solvinert is soaked in cesium bicarbonate solution. This material (Solvinert) appears under infrared analysis to be terpolymer of polyvinyl alcohol, polyvinyl chloride and polyvinyl acetate.

Other membrane materials useful as immobilizing mediums for various liquids wet thereby include the ultrafine porous membrane disclosed in U.S. Pat. application Ser. No. 717,893 — Weininger et al. (filed Apr. 1, 1968, now abandoned, and assigned to the assignee of the instant invention) and the materials described in U.S. Pat. Nos. 3,378,057 — Sargent et al.; 2,984,869 — Honey et al.; 3,351,489 — Larson et al.; 3,216,882 — Feldt et al., and 3,062,760 — Dermody et al. The disclosures of the aforementioned patent application and patents are incorporated herein by reference in their entirety.

Before interleaving the membrane assemblies 12 between separator screens 11, 11a the separator screens must be prepared so that after the steps that follow (assembly and potting) have been executed and the potting medium has hardened, the manifolding system may be developed simply by drilling holes through the package.

The preparation referred to is the impregnating of each separator screen with peripheral bead segments 13 and 14 and inwardly-directed bead extensions 17 as shown. The beads should be of uniform height relative to the plane of the screen. Preferably, the material of which the beads are composed will be a chemically inert self-setting liquid, which sets or cures as an elastomeric material. As may be seen from the drawing, the bead extensions 17 partially define small spaced areas, which fall into two categories, (a) those which are additionally defined by bead segments 13, 14 (note bead portions 13a, 14a) and (b) those between which bead material is missing. Separator screen 11 differs from separator screen 11a only in its orientation in the assembly as may be seen in FIG. 1. Because of this difference in orientation and repetition of the two orientations, each of the two different categories of defined small spaced areas will be aligned with similar area of the same category, when screen separators and membranes are assembled. The purpose for the presence or absence of bead portions 13a, 14a is explained hereinbelow.

The preparation of membrance assembly 12 will depend upon whether the microporous membrane is made of material that will be readily bonded to the non-porous membrane by an intermediate layer of the potting compounds as described hereinbelow. If the microporous membrane material is not readily bonded to the non-porous membrane 12a by the particular potting compound selected, it will be necessary to treat those discrete areas of the microporous membrane (both sides) in order to make these surfaces wetting and bondable.

These discrete areas of membrane will be those areas that will be contiguous (when assembled) with the areas of screens 11, 11a lying between extensions 17 and along the border areas thereof. The microporous sheet can be masked so as to treat only the particular areas required for bonding and treatment may involve exposure to corona discharge or chemical treatment to make these areas bondable. In the case of polypropylene, oxidation of the surface areas to be treated (e.g., by corona discharge or by chemical oxidation) has been successfully employed to render the polypropylene bondable.

In any case (whether or not microporous membrane 12b has required treatment) microporous membrane 12 is attached to the non-porous membrane 12a by applying a thin film of the potting compound over the treated areas thereby securing the membranes into a single unit. These units are then allowed to cure, after which they can be handled as a single membrane.

When the desired number of bead-impregnated separator screens 11, 11a have been prepared, the membrane assemblies 12 and separating screens 11, 11a are stacked so that each pair of membrane assemblies 12 has a separator screen therebetween. However, the disposition of the screen separators above and below any given membrane differs in that bead portions 13a, 14a in any given screen separator will overlie locations in the separator screen immediately therebelow from which bead portions are missing. Bead portions 13a of alternate separator screens will be in vertical alignment and similarly bead portions 14a of alternate separator screens will be in vertical alignment.

When the package of membrane assemblies and separating screens has been made, the assembly is clamped tight. Thereafter, each edge of the assembly is immersed to a predetermined depth in a liquid potting compound. The liquid potting compound enters the package through the exposed edges of the separator screens until it encounters beads 13 and 14, which prevents its further penetration, except for each defined area between bead extremities 17, where a gap exists between beads 13 and 14. In these areas and along the edge regions the potting compound is free to enter to the extent shown (stippled area).

An example of a suitable potting compound for use with Solvinert membranes in which a liquid membrane has been immobilized is a bisphenol-A based epoxy resin to which has been added a catalyst system consisting of a modified polyamine plus polyamide. Another useful potting material is polyester adhesive.

The bead material is preferably an elastomer such as room temperature vulcanizing silicone rubber, although other materials such as wax or putty may be satisfactorily employed for this damming function. In the case of a potting liquid curing as an elastomer it is preferred to apply the bead material to the screen and then place the screen between plate surfaces (e.g., plexiglass) with spacing means such that the bead when cured (plates removed) is slightly thicker than the screen it impregnates and is of uniform height from the plane of the screen. Thus when in the assembly (FIGS. 2-5) the beads are under compression and are in sealing engagement with adjacent surfaces of the membrane assembly 12 during the potting.

After completion of the potting operation and subsequent curing, the edges of each membrane and separator screen in the assembly are bonded into unified walls such as is shown in FIGS. 2-5. Wherever portions of the damming beads 13, 14 are lacking, the potting liquid proceeds further inward to develop projections, or extensions, 18 in vertical alignment over each other (in alternate layers).

When the potting material has hardened, holes are drilled through the package transverse to the direction of the planes of the laminae. Each of these holes passes through each screen and through each extension 18 that is encountered to form a vertical manifolding arrangement.

Figure 3:
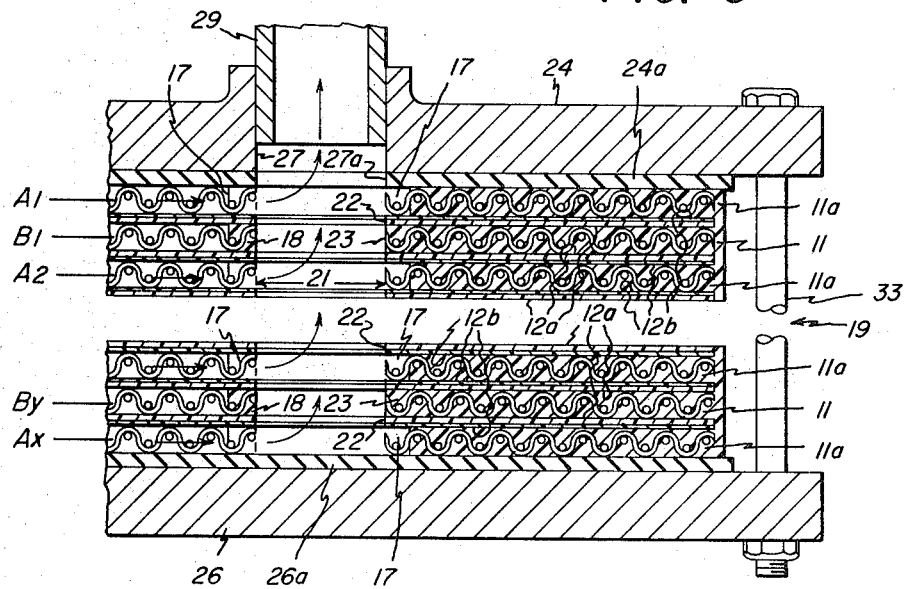
FIGS. 3, 4 and 5 are similar to FIG. 1 being taken on lines 3—3, 4—4 and 5—5, respectively.
Figure 4:
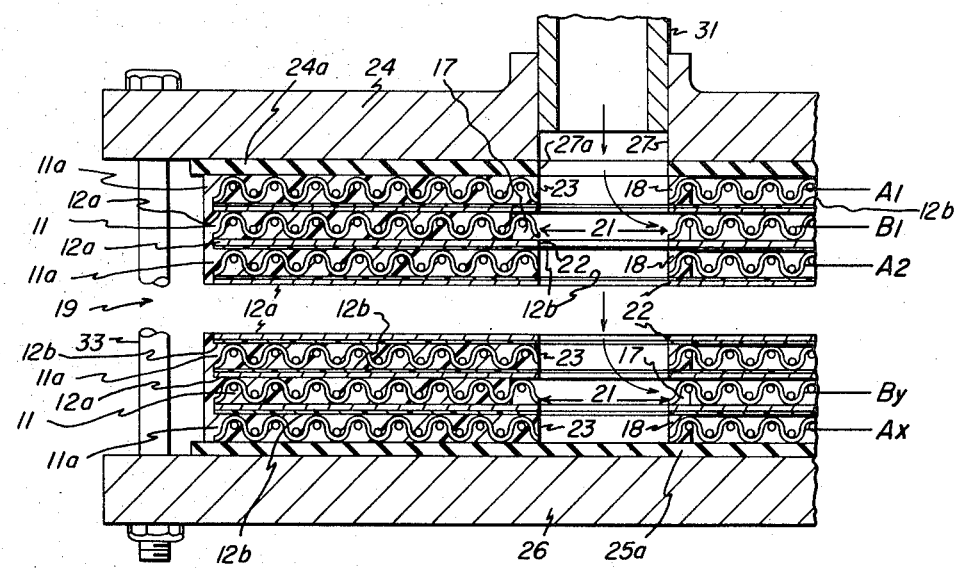
Figure 5:
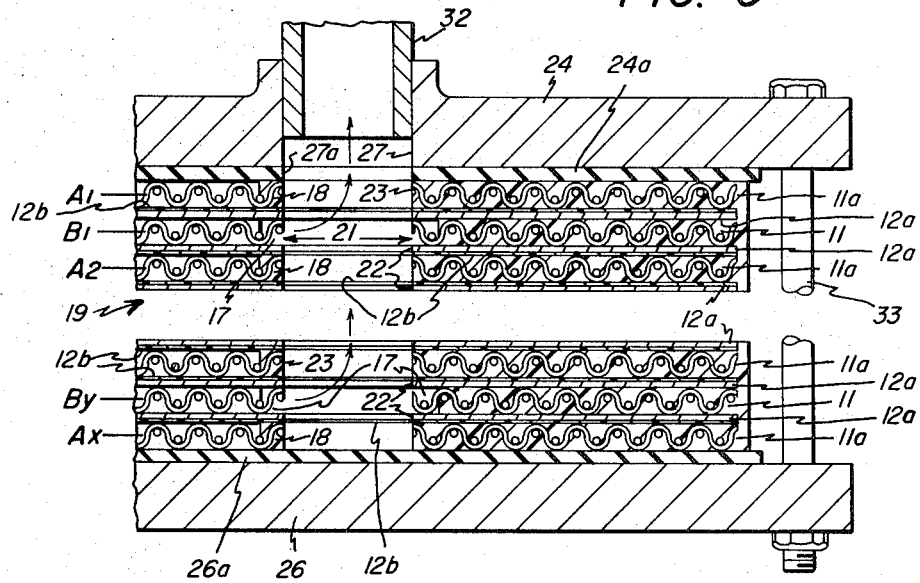

Thus, in the assembled membrane package 19 the same sequence of holes exists along a section taken on line 2—2 (FIG. 2) as occurs along a section taken on line 3—3 (FIG. 3). Similarly, the same sequence of holes exists along a section taken on line 4—4 (FIG. 4) as occurs along a section taken on line 5—5 (FIG. 5). By way of illustration, in FIGS. 2 and 3 hole 21 is the hole through the uppermost separator screen and this hole passes through screen material only. Hole 22 is the hole through the uppermost membrane assembly 12. Hole 23 is the hole immediately thereunder and this hole passes through both the potting material of extension 18 and the screen embedded therein. The same sequence then repeats itself. In the sections shown in FIGS. 4 and 5, the sequence of holes begins with a hole 23 through the uppermost screen, passing through both the potting material of extension 18 and the screen embedded therein.

Figure 8:
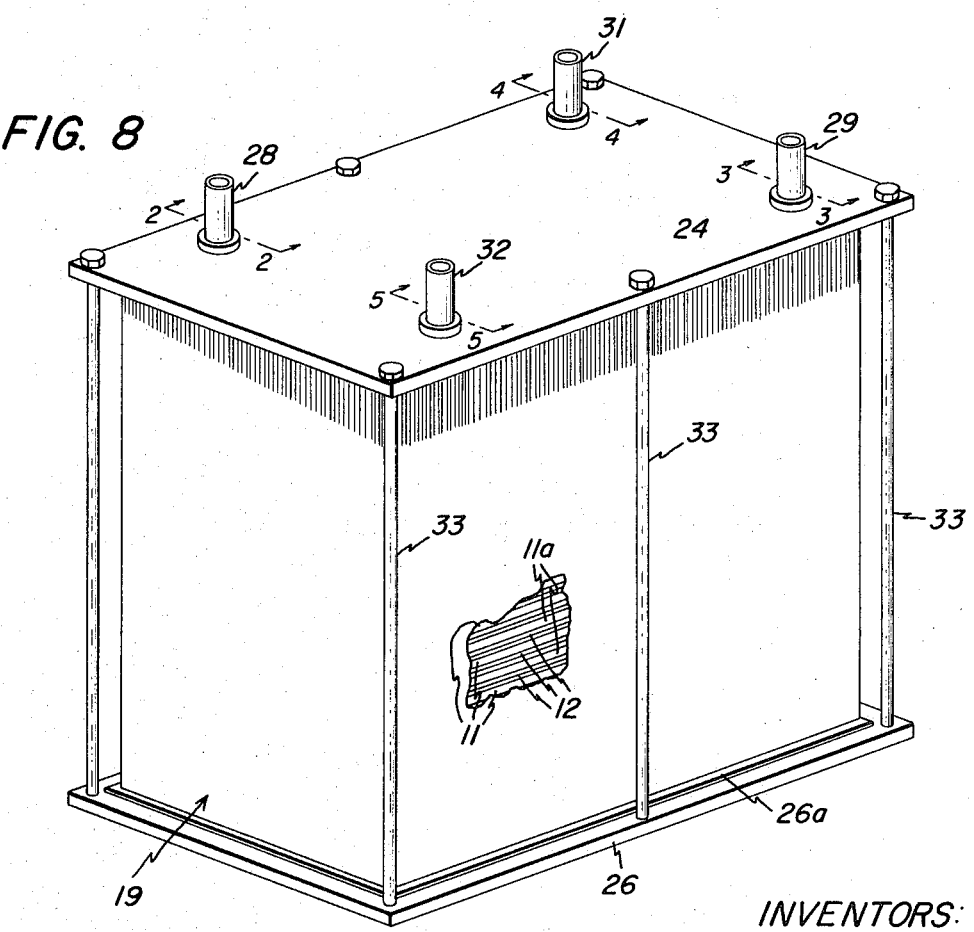
FIG. 8 is a three-dimensional view of a membrane package in which the instant invention may be employed.

The membrane package 19 is then sandwiched between metal end plates 24, 26 and gaskets 24a, 26a having holes 27, 27a, respectively, matching with the vertical sequence of manifolding holes in the membrane package 19. End plates 24, 26 serve both to force the gaskets into sealing engagement with the membrane package 19 and to provide terminals for conduits 28, 29, 31, 32 as shown in FIG. 8. Fasteners 33 arranged around the perimeter of the device as shown in FIG. 8 provide biasing force for the end plates.

Optionally, the first and last laminae of the membrane package 19 may be of solid sheet, e.g., thin sheet metal (pre-drilled for manifold connections) to provide stiffness and protection for the package. When employed, such stiffener sheets become an integral part of the package after the potting operation. End plates and gaskets are then employed as described hereinabove.

In operation a flow of feed gas entering through conduit 28 will exit via holes 21 to pass through the alternate flow volumes $A_1, A_2 \ldots A_x$ comprising flow volume group A. This feed gas stream sweeps over the surfaces of microporous membrane(s) 12b forming the boundaries thereof on its way to exit conduit 29 via holes 21 at that vertical manifold as is shown in FIG. 3. Simultaneously, the sweep gas stream enters conduit 31 and is manifolded via holes 21 into flow channels $B_1, B_2 \ldots B_y$ comprising flow volume group B. The sweep gas stream exits via holes 21 from flow volume group B to leave the device via conduit 32 as is shown in FIG. 5.

Figure 6:
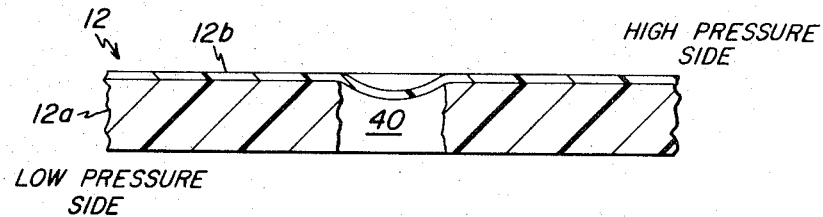
FIG. 6 is an enlarged sectional view of a membrane assembly according to this invention in which a single microporous membrane is employed in combination with a non-porous membrane.

Usually, the feed gas enters under pressure significantly greater than the sweep gas. As a result, the pressure in flow volumes $A_1, A_2 \ldots A_x$ is greater than the pressure in the adjoining flow volumes constituting group B. For this reason, the membrane assemblies 12 are disposed so that microporous membranes 12b face the flow volumes of group A (the high pressure side) and, should a tear or other breach occur in any of membranes 12a, the entire pressure load at such discontinuities is maintained by the microporous membrane 12b. This force is sufficient to push the microporous membrane 12b into the breach 40 (FIG. 6) sealing against the rim thereof. This sealing "plug," in effect, presents a small area of microporous membrane 12b in place of the open breach 40. As a result the cross-membrane leak rates are very drastically reduced, reducing in turn the reject rate of membrane packages. By way of example, the cross-membrane leak rates for small pin holes or minor tears have been observed to be of the order of at least 3 cubic centimeters/sec for pressure differences ranging from 1 to 2 psi. In contrast thereto membrane assemblies 12 in which a one mil microporous polypropylene membrane (Celanese Corp.) was placed on the high pressure side of a 5 mil thick immobilized liquid membrane that had been pierced with a needle and/or slit with a razor, leak rates of the order of 0.1 cc/sec. were measured on the low pressure side for pressure differences up to 20 psig.

Figure 7:
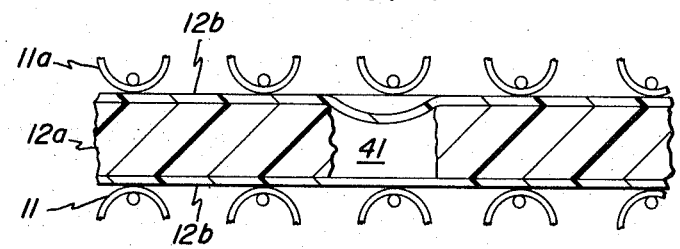
FIG. 7 is an enlarged sectional view of a membrane assembly wherein a microporous membrane is disposed against each major face of a non-porous membrane.

A one-foot square immobilized liquid membrane was pierced and slit and incorporated into a three-membrane test module as an assembly with two microporous polypropylene membranes (each 1 mil thick), one disposed on each side of the damaged immobilized liquid membrane as shown in FIG. 7. At cross-membrane pressures of 10 psi, the maximum leak rate observed through discontinuities such as hole 41 was about 0.67 cc/sec. Thus, the effectiveness of the microporous layer 12b to "seal" leaks in non-porous membranes 12a is due to the large permeability thereof compared to the permeability of the non-porous material, but the small permeability thereof compared to the permeability of the breach. For example, in the case of an immobilized cesium bicarbonate membrane 5 mils thick for $CO_2/O_2$ separation, the microporous film can be of a thickness in the range of from about 1 to about 5 mils and have a $CO_2$ permeability ranging from about $5,000 \times 10^{-9}$ to $50,000 \times 10^{-9}$.

The construction shown in FIG. 7 is of particular advantage not only for the healing capability for discontinuities in the non-porous membrane 12a, but also for the capability offered for protecting such membranes 12a (which are typically easily damaged) from injury by contact with spacer screens 11, 11a.

At each channel (hole 23) provided through an extension 18, the fluid flow traversing the channel is prevented from entering the flow channel abutting the extension by the presence of the potting material comprising extension 18 and forming the confining walls of each hole 23. In addition, these confining walls serve to bond together the screen separator embedded therein and each membrane assembly 12 located at a face of extension 18. As described hereinabove, membranes 12a and 12b in each assembly 12 will have been previously bonded together in these same regions and along the borders.

The membrane assembly constructions of the instant invention may be employed in any gas transfer membrane package construction wherein a sheet of non-porous membrane forms at least part of the wall area of a closed volume and means are provided to support the membrane (or to separate adjacent membranes) whereby the membrane can be subjected to a pressure differential.

What we claim as new and desire to secure by Letters Patent of the United States is:

1. In a packaged membrane system in which (a) a plurality of spaced non-porous membranes are disposed in surface-to-surface array to define at least a first closed flow volume and at least a second closed flow volume adjacent thereto, (b) spacing means for the membranes is located therebetween, and (c) means are provided for separate access to and egress from said first and second flow volumes, the combination with each of said non-porous membranes of at least one microporous membrane in face-to-face contact therewith, said microporous membrane having a gas permeability of at least about 10 times the gas permeability of said non-porous membrane, the ratio of the thickness of said microporous membrane to the thickness of said non-porous membrane being in the range of from about 1:1 to about 1:10.

2. The combination of claim 1 wherein the non-porous and microporous membranes are bonded together over part of their contact surface area.

3. The combination of claim 1 wherein the non-porous membrane is an immobilized liquid membrane.

4. The combination of claim 1 wherein the microporous membrane is made of polypropylene.

5. The combination of claim 1 wherein one microporous membrane is disposed on each side of the non-porous membrane.

* * * * *